US012561466B2

(12) United States Patent
Zaigouche et al.

(10) Patent No.: US 12,561,466 B2
(45) Date of Patent: Feb. 24, 2026

(54) DATA COLLABORATION WITH SOVEREIGNTY

(71) Applicant: AMADEUS S.A.S., Biot (FR)

(72) Inventors: Tarek Zaigouche, Nice (FR); Liming Yang, Valbonne (FR); Majed Somai, Antibes (FR)

(73) Assignee: AMADEUS S.A.S., Biot (FR)

( * ) Notice: Subject to any disclaimer, the term of this patent is extended or adjusted under 35 U.S.C. 154(b) by 103 days.

(21) Appl. No.: 18/389,034

(22) Filed: Nov. 13, 2023

(65) Prior Publication Data

US 2024/0160764 A1     May 16, 2024

(30) Foreign Application Priority Data

Nov. 14, 2022    (EP) ..................................... 22207349

(51) Int. Cl.
*G06F 21/62*        (2013.01)
*G06F 16/2458*      (2019.01)
(52) U.S. Cl.
CPC ...... *G06F 21/6218* (2013.01); *G06F 16/2468* (2019.01)
(58) Field of Classification Search
None
See application file for complete search history.

(56) References Cited

U.S. PATENT DOCUMENTS

| | | | |
|---|---|---|---|
| 8,514,186 B2 | 8/2013 | Tan et al. | |
| 9,262,742 B2 | 2/2016 | Moonka et al. | |
| 10,949,434 B1 * | 3/2021 | Tirupattur Saravanan | .................. G06Q 50/01 |
| 11,334,680 B1 | 5/2022 | Know et al. | |
| 2010/0063863 A1 | 3/2010 | Begeja et al. | |
| 2010/0063993 A1 * | 3/2010 | Higgins | ................. G06Q 10/10 709/201 |
| 2018/0276414 A1 | 9/2018 | Beckman et al. | |

OTHER PUBLICATIONS

"Extended European Search Report", dated Apr. 26, 2023, issued in the corresponding European Patent Application No. 22207349.6, Filed Nov. 14, 2022.
Rahman, Mohammad Shahriar, et al. "Accountable cross-border data sharing using blockchain under relaxed trust assumption." IEEE Transactions on Engineering Management 67.4 (2020): 1476-1486.

* cited by examiner

*Primary Examiner* — Brandon Hoffman
(74) *Attorney, Agent, or Firm* — PERRY + CURRIER INC.

(57)         ABSTRACT

A system and method is described for correlating user data across a data border between regions. A method includes obtaining access to a first database of user data stored by a first data manager in a first region and obtaining access to a second database of user data stored by a second data manager in a second region. At least one event is identified that is triggered by a user or a data manager in the first or second region. The second database of user data is then analysed to identify a subset of user data for one or more users correlated with the event. The identified subset of user data is then compared with user data in the first database to obtain a matching subset of user data from the first database. The matching subset of user data is then reported from the first database to the first data manager.

16 Claims, 6 Drawing Sheets

DATA COLLABORATION WITH SOVEREIGNTY

FIELD OF THE INVENTION

The present application relates to the field of cross-border data management and use, in particular for correlating user data across data borders such as geographical region or industry-specific borders. The methods and systems described enable the management of data in different regions without undermining data sovereignty.

BACKGROUND OF THE INVENTION

It is common practice for different organisations and entities to collect data about their users. Such data ranges from contact information, such as name, address and telephone number, to user preference information, such as preferred products. The data may also include data that has been obtained by analysis of user behaviour by the organisation, for example the user's usual level of spend with an organisation, or may include data specific to that organisation such as travel or event plans derived from bookings made by the user.

While some of this stored data can be made available to third parties, for example to provide targeted information or marketing, much of the stored data is restricted in its distribution and use by governing authorities, regulation or codes of conduct and cannot be shared outside an organisation or region. In one specific example, the European General Data Protection Regulation (GDPR) governs and tightly restricts the storage and use of data within Europe. In particular, under the GDPR regulation, data cannot be stored or shared without explicit user approval.

Similarly, under the US Health Insurance Portability and Accountability Act (HIPAA), healthcare related data cannot be shared with other entities without explicit user approval to do so.

Issues associated with such regulations are highlighted by methods such as that described in U.S. Pat. No. 9,262,742, which describes a method that includes identifying one or more user lists based on owned or permissioned data, each user list including a unique identifier. Metadata is associated with each user list including data describing a category for the user list, population data describing statistical or inferred data concerning a list or members in a given user list and subscription data including data concerning use of a given user list. A user list identifier is stored in a searchable database together with the associated metadata. The method then includes publishing for potential subscribers a list of the user lists including providing an interface that includes for each user list the unique identifier and the associated metadata. Such a method can enable subscribers to select lists of user data for access or purchase.

However, as the skilled person will appreciate, in order to comply with regulations such as GDPR, the ability to share or sell the user lists described in U.S. Pat. No. 9,262,742 is highly restricted. In particular, data could only be shared with the explicit permission of each owner of the data. Therefore, in many situations, it is not possible to share the user data obtained.

U.S. Pat. No. 9,514,186 describes a centralised user list access interface in which metadata about each list is received from different data owners. An interface is provided to enable data owners to manage their advertised lists and to allow subscribers to view and access the lists. U.S. Pat. No. 9,514,186 describes a system that includes identifying a user-list which is based on owned or permissioned data, wherein the user-list is associated with a corresponding owner database. An application programming interface (API) is provided to communicate with the owner database. Metadata related to the user list is received from the owner database through the API. The metadata includes data describing a category for the user-list. A user-list identifier corresponding to the user-list and the associated metadata is stored in a searchable database. A user-interface is provided that includes the user-list identifier and the corresponding associated metadata. The user-interface is configured to receive one or more management instructions related to the user-list from a user-list subscriber.

However, such an interface does not solve the problems identified above since some of the permissions may be US state, country or region-specific or must be kept within a particular industry (financial/healthcare (HIPAA)). Or the list might be specific to a particular company with permission not being granted to share. In each of these cases, regulations significantly limit the use of the systems described.

It is noted that in relation to GDPR, entities based outside the EU still need to comply because data held about an EU-based consumer needs to be held within the EU according to GDPR requirements. This further significantly restricts cross-border data flow.

In summary, data cannot be transferred across data borders whether they be between companies, industries or locations. This restricts use and sale of the data cross-border.

SUMMARY OF THE INVENTION

Aspects of the invention are set out in the independent claims and preferred features are set out in the dependent claims. Features of one aspect may be applied to other aspects alone or in combination.

According to one aspect, there is provided a method for correlating user data across a data border between regions, the method comprising:

obtaining access to a first database of user data stored by a first data manager in a first region;

obtaining access to a second database of user data stored by a second data manager in a second region identifying at least one event triggered by a user or a data manager in the first or second region;

analysing the second database of user data to identify a subset of user data for one or more users correlated with the event;

comparing the identified subset of user data with user data in the first database to obtain a matching subset of user data from the first database;

reporting the matching subset of user data from the first database to the first data manager.

As described in more detail herein, the method enables matching of data from one region with data from another region without compromising the sovereignty of the data, that is without requiring data to leave the region in which it is authorised to be stored. So data from the second region is matched with data from the first region without either data set leaving its home region. As described above, the regions are divided by data borders and may be associated with different physical locations (such as Europe/US), different industries (e.g. healthcare, travel, financial) or simply with different organisations and companies. A data border is any divide that data cannot cross, for example for regulatory purposes or simply because permissions associated with the data do not allow data sharing.

Optionally, the method further includes obtaining metadata for the first data manager. Such metadata may include the type of entity, the location of the data manager, the size of the data manager, the number of users, events the data manager has specified they might be interested in, etc.

Obtaining metadata may include storing metadata for one or more data managers in a central database and retrieving such metadata from storage. A central database may be stored in a cloud based system.

Alternatively, or in addition, identifying at least one event comprises receiving a request from the first data manager to obtain matching user data, the request including metadata for the first data manager. That is, an incoming request from the first data manager may itself include metadata related to the first data manager, such as that listed above.

Optionally, the method may further include obtaining or generating event metadata for the at least one event. For example, this metadata might relate to the timing of an event, the type of event, the cost of an event or the location of an event.

Identifying at least one event relevant to the data manager in the first region may further include matching the metadata for the first data manager to the event metadata for the at least one event. The more items of meta data that match, or the closer the match, the higher the relevance of the event to the data manager.

In some embodiments, the first region comprises a plurality of data managers each having a corresponding database of user data, wherein comparing the identified subset of user data comprises comparing the identified subset with user data in each of the plurality of databases and wherein reporting comprises reporting a matching subset of user data to each of the data managers for whom matching user data has been identified. That is, data matching may be attempted on one or more data sets stored at the interface for the first region. Data matching results are then reported to each data manager in the first region for whom a match has been identified in the data.

Optionally, the method further comprises storing a database of events tagged with event metadata. The database may be updated periodically, for example as timed events expire or as new events are identified. Other events may remain in the database permanently, for example if they are not linked to a particular time and therefore will not expire.

In some embodiments, obtaining access to a first or second database comprises copying the first or second database to a storage interface in the first or second region respectively, preferably this is a permanent storage interface. Alternatively, obtaining access to a first or second database comprises accessing the database via an interface or direct log in to the database without copying the database to storage. Data can be proactively uploaded when a data manager subscribes to the system.

In one embodiment, analysing the second database comprises comparing event metadata for the at least one event to user data for the one or more users in the second database to identify one or more users correlated with the event.

User data may include information such as the user's location or expected location at a particular time, information about travel bookings such as flights and hotels, information about previous or current expenditure (for example whether upgrades or expensive products have been purchased). Outside the travel industry, the information may include medical information or financial information.

Optionally, analysing comprises identifying exact matches between the event metadata and the user data.

Preferably, more than one field of metadata is matched in order to confirm a match in the analysis.

Alternatively, analysing comprises performing a fuzzy match correlation or a probabilistic match correlation between the event metadata and the user data. Hence a match can be generated or identified if enough of the fields match closely enough for it to be likely that there is correlation between the data, as described in more detail below.

Comparing the identified user data for the one or more users correlated with the event with user data in the first database of user data may comprise identifying exact matches or performing a fuzzy match correlation or a probabilistic match correlation.

Optionally, the method also includes storing a list of events together with associated event metadata and publishing the list of events to one or more data managers. This can enable the data managers to proactively identify events for which they might be interested in obtaining corresponding user data.

In one embodiment, the method includes at least partially anonymising the user data stored in the first or second database. This can allow analysis of the data to be performed without risking the sharing or copying of data across data borders.

Optionally, at least partially anonymising comprises masking personally identifying information or generating a hash of the personally identifying information. The personally identifying information (PII) can simply be removed, with any matching being performed on remaining information, or techniques such as hashing can be used to enable the PII to be matched in the different databases without actually being shared across borders. In a particular implementation, data entries may be hashed before being read into the memory of the data matching engine.

According to a further embodiment, there is described herein a data matching engine for correlating user data across a data border between regions, the engine comprising:

means for obtaining access to a first database of user data stored by a first data manager in a first region;

means for obtaining access to a second database of user data stored by a second data manager in a second region;

means for identifying at least one event triggered by a user or a data manager in the first or second region;

means for analysing the second database of user data to identify user data for one or more users correlated with the event;

means for comparing the identified user data for the one or more users correlated with the event with user data in the first database of user data to obtain a subset of user data from the first database;

means for reporting the subset of user data from the first database to the first data manager.

The data matching engine may also include means for implementing any of the methods described above or herein.

According to a further embodiment, there is also described a data matching system for correlating user data across a data border between regions, the system comprising:

a first interface for obtaining access to a first database of user data stored by a first data manager in a first region;

a second interface for obtaining access to a second database of user data stored by a second data manager in a second region;

a data matching engine comprising at least one processor and a computer program, computer program product or non-transitory computer-readable medium storing instructions that, when executed by the at least one processor, cause the at least one processor to perform operations comprising:

identifying at least one event triggered by a user or a data manager in the first or second region and analysing the second database of user data to identify user data for one or more users correlated with the event;

comparing the identified user data for the one or more users correlated with the event with user data in the first database of user data to obtain a subset of user data from the first database; and reporting the subset of user data from the first database to the first data manager.

The data matching system may also include a processor programmed to performed any of the methods described above or herein.

In another embodiment, there is provided a method for correlating user data across a data border between regions, the method comprising:

obtaining access to a first database of user data stored by a first data manager in a first region;

obtaining access to a second database of user data stored by a second data manager in a second region;

analysing the first database of user data and the second database of user data to identify a matching subset of user data;

generating a correlation profile between the first data manager and the second data manager based on the analysis, wherein the correlation profile is based on the analysis identifying the matching subset of user data;

reporting the correlation profile to at least one of the first data manager and the second data manager.

The method creates a correlation profile in order to determine a degree of matching between the data stored by the first data manager and the data stored by the second data manager. This is achieved without transfer of data across data borders by obtaining access to each database that remains stored within its respective region. Any data that needs to be transferred in the central cloud-based computing platform can first be processed to remove personally identifying information PII. Alternatively, a hash or other encrypted version of each data entry can be generated to enable comparison of the data from the first database with data from the second database without the data itself leaving the region in which it is stored.

If the correlation profile indicates a close match between the two data sets, either across all data fields or within particular fields, this can be used by the first and the second data manager to identify areas in which they should work together. For example, a hotel in one region may discover they their data is highly correlated with that of a particular airline. This may enable the data managers to work together, for example to promote events of another data manager to their own registered users, It will be appreciated that preferred features of the first embodiment of the system described above may be implemented in conjunction with the present embodiment.

BRIEF DESCRIPTION OF THE FIGURES

Methods and systems for correlating user data across a data border between regions are described by way of example only in relation to the figures wherein.

DETAILED DESCRIPTION

Figure 1:
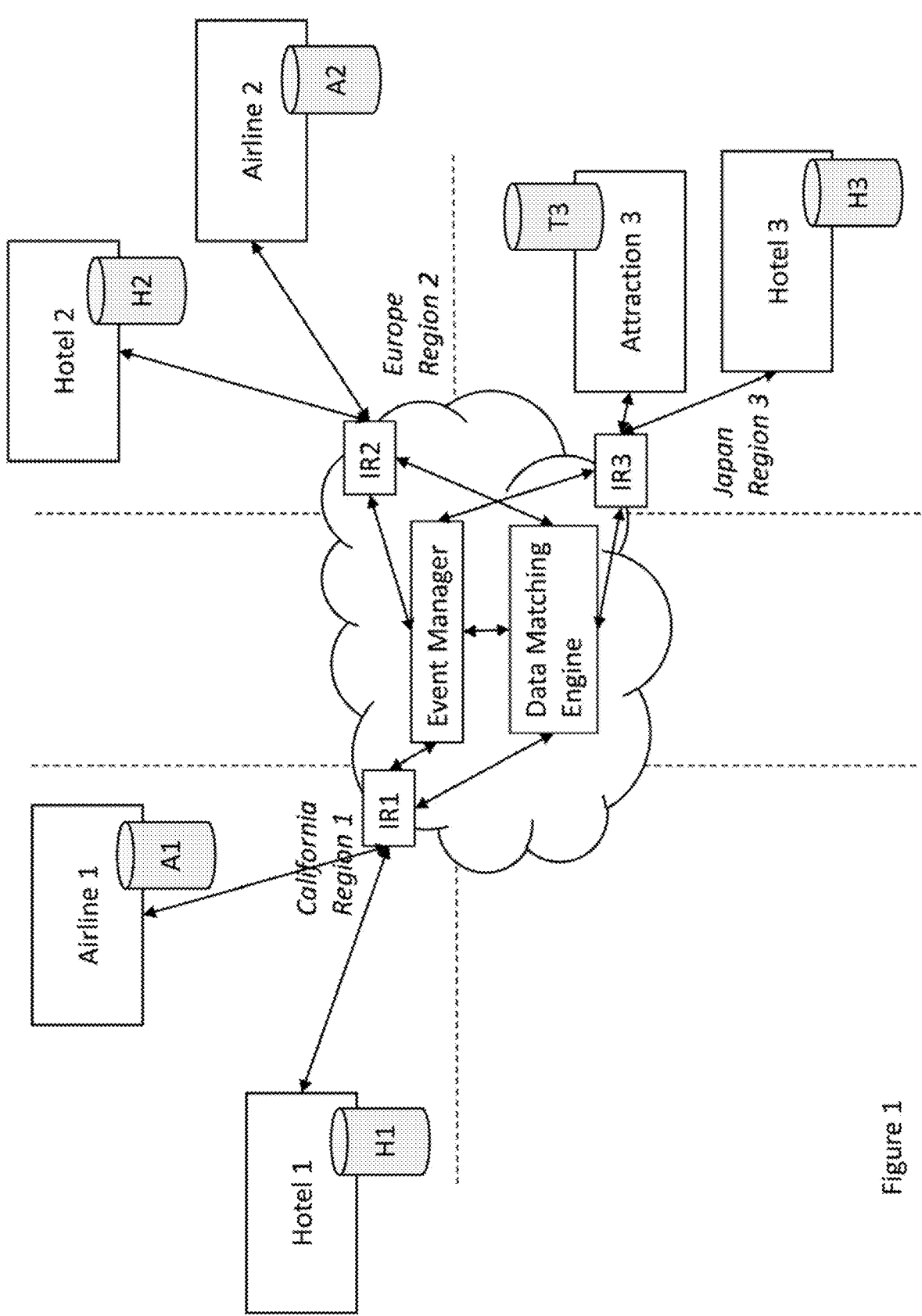
FIG. 1 shows an exemplary diagram of a data matching system according to one embodiment.

The term "personal data" or "user data" as used herein refers to data associated with and/or specific to an individual or an owner. Personal data can include but is not limited to personal identifiable information, such as a name, a title, an address, a date of birth, an age, a sex, a telephone number, an email address, payment information, health information, financial information, travel information, purchase order information, a social media profile, official identification information, legal information, biometric information and/or other information of an individual or an owner. A subset of the personal data may also be termed "Personally identifying information" (PII). PII is particularly subject to regulation such as under GDPR.

The term "data owner" as used herein encompasses a user device (or data owner device) belonging to or associated with a particular user, the user being associated with the personal data. The user device has an interface to enable the user to interact with the present system, optionally via a touchpoint as described below, and the user device is also in communication with the data host and the other elements of the system described herein. The term "data owner" may also be used to refer to the user, such as a consumer, patient, business or entity, to whom the data belongs. This may be a person or a corporate or other legal entity.

The term "data manager" as used herein refers to an entity that collects and stores personal data from a plurality of data owners. The data manager may also be termed a "data controller", particularly in the context of GDPR and other regulatory contexts. The data manager must comply with any national or regional data protection laws, including using and storing data in accordance with any restrictions placed on it by the data owner. In other systems, the data manager may be subject to requirements such as ensuring data is not shared outside particular organisations or is only shared in accordance with user preferences.

The term "data platform" refers to a platform designed for exchange of data and/or metadata in accordance with the methods, systems and principles described herein. The data platform may be a cloud-based system.

The term "data matching engine" refers to software running on the data platform for analysing and correlating data and metadata made accessible to it from a plurality of data managers.

The term "data border" as used herein refers to a regulatory or legal divide between two zones in which data may be held. Data borders may include national or regional borders, divided by laws and regulations such as the European Union (EU) General Data Protection Regulation (GDPR). Data borders may also surround data that relates to particular subject matter, such as medical information protected by the US Health Insurance Portability and Accountability Act (HIPAA) or financial information protected by the US Gramm-Leach-Bliley Act (GLBA). In some cases, data borders may not be strictly regulatory, but can be governed by user preference settings, for example a user may have provided information only for the use of one or more particular corporate entities and the information may not be shared beyond the borders of those specified entities. Borders may also be established between different data managers by agreement.

FIG. 1 illustrates an exemplary system that may be used to implement the methods described herein. In particular, the system includes a central cloud-based platform running a data matching engine and event manager. The data matching engine and event manager are illustrated separately in FIG. 1, but may be implemented in the same hardware or may be implemented across multiple hardware instances such as a distributed network of servers or virtual machines.

As described in more detail below, the data matching engine processes data entries stored within databases to determine whether matches can be identified. The event manager is arranged to store details about events in the form of event metadata, and optionally to identify events and generate event metadata for such events, as described in more detail below.

At the edge of the central cloud-based computing platform are arranged a plurality of region interfaces. IR1, IR2 and IR3 are illustrated in FIG. 1 but more or fewer region interfaces may be provided depending on the number of regions implemented within the system.

The regions are arranged with data borders between them, across which data must not pass for regulatory reasons or simply because a user has not granted permission for their data to exit the region. The data borders may be arranged for example geographically, between different companies or between different industries.

Since the region interfaces sit on the edges of the cloud-based platform, they are located within their respective regions, but accessible by the data matching engine and event manager.

The region interfaces can store databases of information, for example information received from the data matching engine, the event manager or from data managers within their respective regions. For example, with reference to FIG. 1, IR1 can store data received from hotel 1 and/or airline 1 within region 1. The region interfaces enable write access for data managers within their region and read access for data managers who subscribe to the data stored within. Data managers provide lists of users along with their consent rules indicating how user information can be used. The lists of users and consent rules are stored in at least one database in dependence on the location of the data manager and/or the user.

The region interfaces can make data stored within them available to the data matching engine and the event manager without the data itself being copied across to the central cloud-based platform. That is, rights to read the data can be granted by the region interfaces, but there is no write access for entities outside the relevant region, across the data border.

Within each region, each region interface is connected to a number of data managers that collect and store data about users of their services within their region. For example IR2 is connected to hotel 2 and airline 2, which each have their own respective databases, H2, A2, of information gathered from their users. This information is described in more detail below, however since region 2 is "Europe", data stored within those databases must be stored in accordance with GDPR and cannot be moved outside the region.

Figure 2:
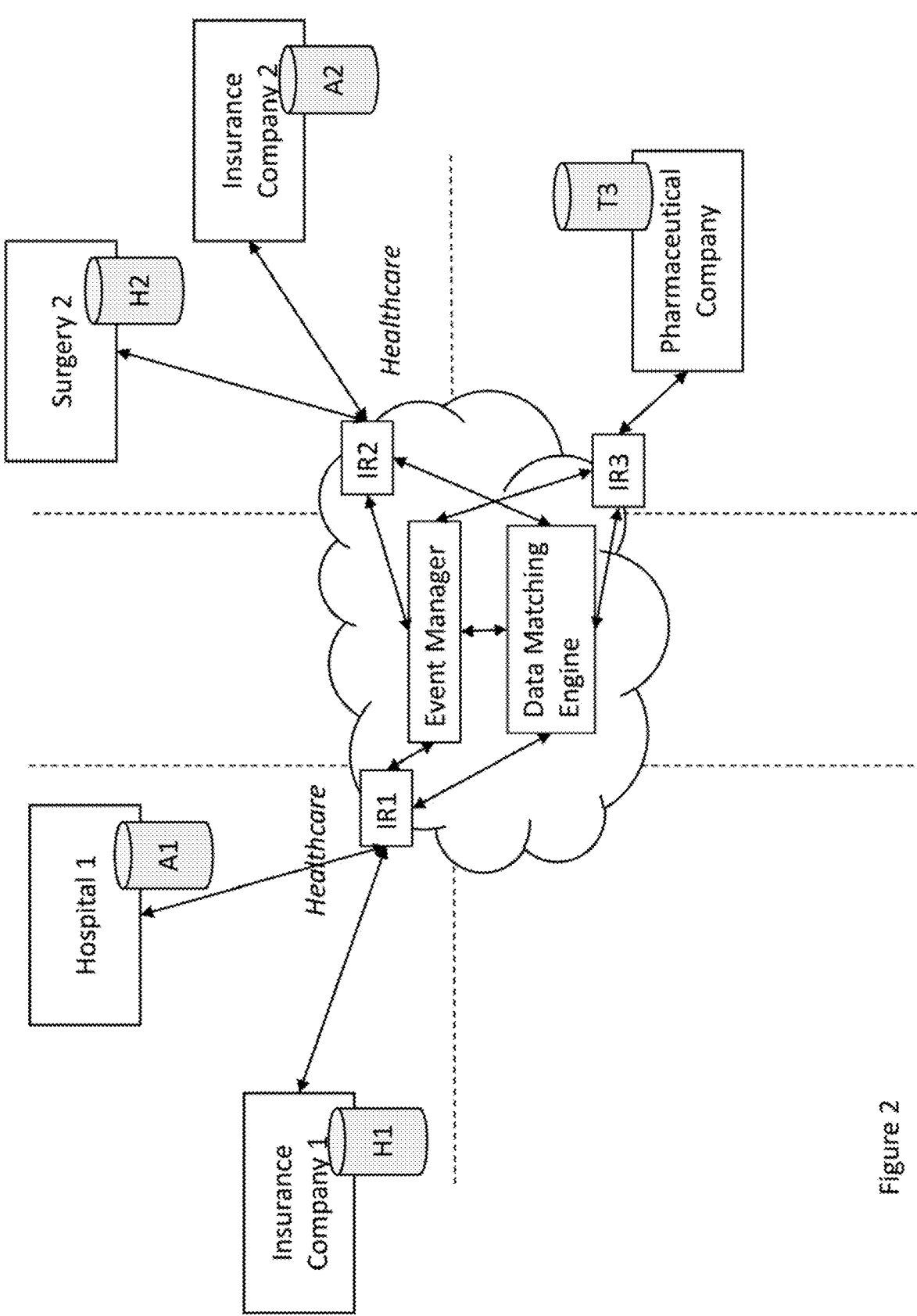
FIG. 2 shows an exemplary diagram of a data matching system according to a further embodiment.

FIG. 2 illustrates a further implementation of the data management system in a healthcare setting. In this embodiment, the data managers include healthcare providers and pharmaceutical companies. Each data manager creates and stores its own database of user information but healthcare information cannot be transferred freely between different entities. Data borders are created between the different entities or regions. The method described below enables data to be matched across those borders without loss of data control or sovereignty.

Figure 3:
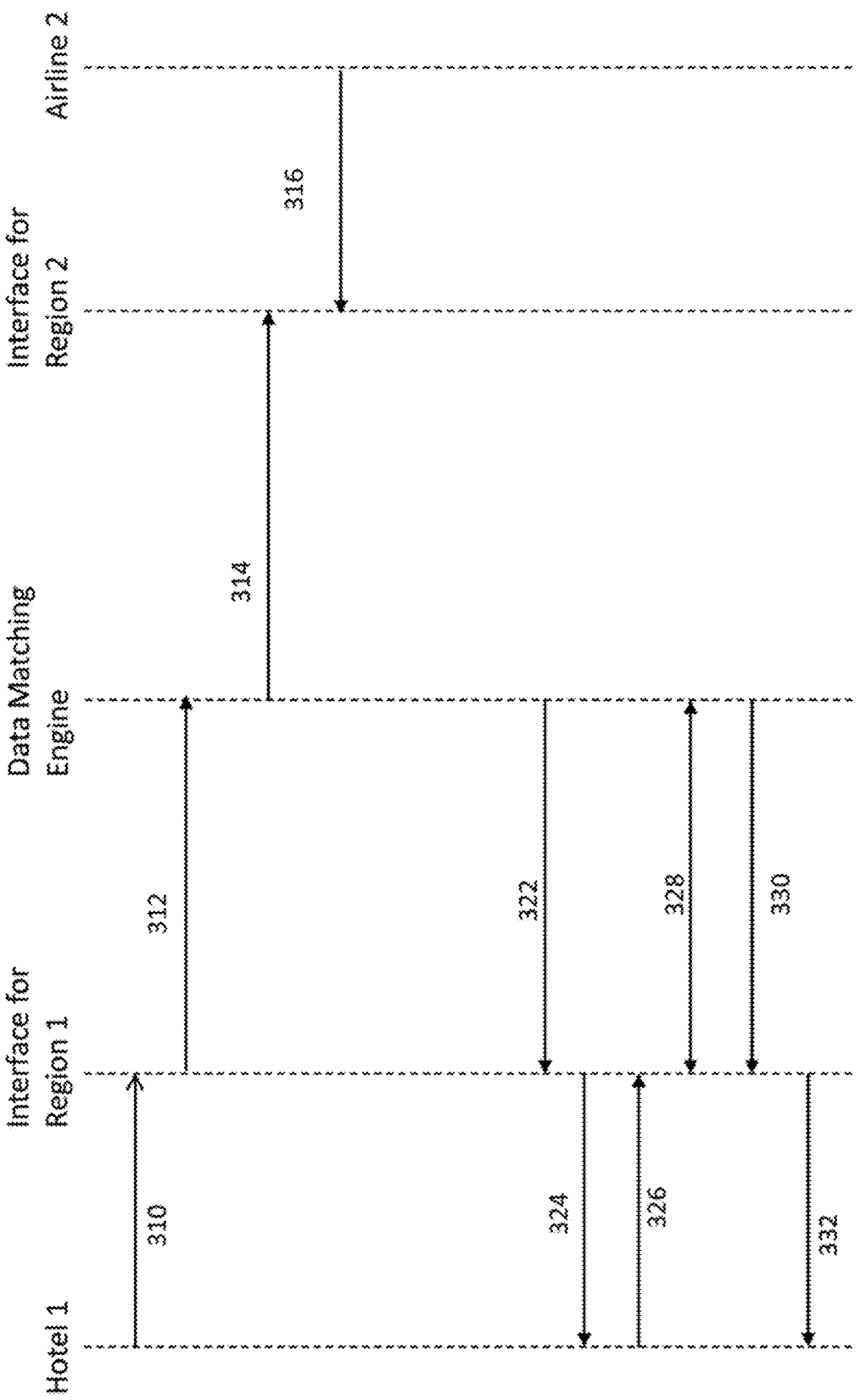
FIG. 3 illustrates schematically the operation of a data matching system according to an embodiment.

A first example of the functionality of the present system is set out in FIG. 3, with reference to the example system architecture illustrated in FIG. 1 in the particular context of the travel industry.

In the example illustrated, hotel 1, based in the region California sends 310 its database of user information to the interface for region 1, which is connected to the cloud-based data platform.

In some embodiments, all data is uploaded to the data matching engine interface to enable matches to be made proactively. However, in other embodiments, there is also an explicit event matching request from hotel 1 asking the data matching engine to find users that match a specific event. The event matching request enables the hotel to obtain information about users that match the requested event and therefore may be of particular interest to the hotel, as described below. The event matching request can include requester metadata including profile information for the hotel such as where it is based, its target price range, opening hours and facilities available. Alternatively, the requester metadata can be stored in a profile for the hotel in the central system, and can be retrieved or generated on receipt of the event matching request from the hotel.

In some embodiments, the event matching request from the hotel may be more specific, for example "visitors arriving from Europe during December who might like to visit a Christmas market". Such a request also includes event metadata, or can be used to generate event metadata within the central system. Event metadata can include information related to the target event defined in the request, for example timing information, information relating to the type of event and information relating to the travellers, such as source or destination information or their expected level of spend.

The event matching request may be sent directly to the data matching engine in the central cloud based system or may be sent 312 via the interface for region 1 as shown in FIG. 3.

The data matching engine processes the event matching request to extract the event and requester metadata, or to generate metadata if it is not already included in the request. This enables the data matching engine to determine an event profile against which other data in the system can be matched. For example, in the specific embodiment described, the event profile may include:

| Traveller origin | Europe | Essential |
|---|---|---|
| Time of interest | December | Essential |
| Minimum length of stay | 7 days | Optional |
| Expenditure | High | Essential |
| Particular interest | Shopping | Optional |

Hence, in this case, the event profile enables the hotel to look for travellers arriving from Europe during December and staying for at least a week, where their expected expenditure is likely to be high. This could be based on factors such as high values or upgraded tickets or extra services having been purchased. Optionally, some of the profile entries may be marked as "essential" within the profile and others may be marked as "optional" so that a match is preferred, but not required for data to be returned.

Based on the essential feature of Europe being the origin of the travellers, the data matching engine then forwards 314 this event profile to the interface for region 2, which interfaces with the "Europe" region.

In an alternative embodiment, an event profile is generated on detection of an event, such the booking of a flight or the opening of a new hotel.

The interface for region 2 also receives 316 for data from one or more data managers in the region in which it is based. For example, data may be received 316 from airline 2 in region 2. In one example, the data may be provided following a specific request from the interface. However, it will be appreciated that the interfaces for the regions may instead gather this data from the data managers periodically and independently of requests from the data matching engine, or preferably the data managers may proactively provide the data to the interfaces.

Data is received 316 from the region 2 data manager, in this case airline 2, at the interface for region 2. This data remains within region 2 since the interface is located within that region. This data can include personal data for users who are clients of the data manager, airline 2.

The interface for region 2 processes the data received from airline 2 to determine whether there is a match between the received data and the event profile. If one or more entries in the received region 2 data matches the event profile, those entries are flagged within the received data or are read into the memory of the data matching engine.

The result generated at the interface for region 2 therefore comprises a subset of entries from the data received from airline 2, the data manager in region 2, in the form of flags added to the original data set or in the form of a database of entries temporarily stored within the data matching engine.

The result is communicated 322 to the interface for region 1, where the event profile originated.

The interface for region 1 then sends a request 324 to the data manager in region 1, in this case hotel 1, which uploads 326 to the interface for region 1 data relating to its own users, unless that step has already occurred when the data manager for region 1 joined the system.

The interface for region 1 works in conjunction with 328 the data matching engine to determine whether there is a match between the subset of entries identified in the data received from airline 2 and the data uploaded by hotel 1 to the interface for region 1.

In a particular embodiment, the interface for region 1 accesses on a read-only basis the data entries that have been identified (tagged or flagged) within the region 2 data at the region 2 interface. This enables the interface for region 1 to determine whether there are any matches between the tagged data in region 2 and the data it holds within its own databases. Alternatively, the database for one or more data managers in region 1 is read into the memory of the data matching engine on a temporary basis to enable matching to be performed between the subset of data tagged from region 2 and the data obtained from the data manager(s) in region 1.

The matching is preferably based on one or more information points within a profile such as user name or user telephone number. While exact matching of information provides the highest confidence of a match, fuzzy matching of entries in which matches are recognized even if the entries are not identical can be particularly useful in this type of situation where users may have entered the same details with two different data managers in two slightly different ways. For example, a hotel located in a single country may collect mobile telephone numbers that are not preceded by a country code. In contrast, an airline operating internationally may store mobile telephone numbers incorporating the country code. Fuzzy matching can enable a match to be acknowledged even if the data is not precisely the same.

Similarly, more advanced machine learning algorithms can be used to identify matches or likely matches within the data. Probabilistic matching can assess multiple fields within the data and enable a weight to be generated for each field depending on how close the match is. A match result is then determined based on the probability of a match across multiple data fields.

For any entries where a match is identified, the details of the matched user are communicated 330, 332 to the first data manager, hotel 1, in region 1.

It will be appreciated that the method described above does not involve a transfer of user data from the second data manager to the first data manager. Rather, the method enables the identification of relevant data that was already present in the systems of the first data manager and therefore was already available to the first data manager.

Furthermore, the method does not involve a transfer of data from region 1 to region 2 within the system, since it simply identifies data already stored in region one.

Once the data has been identified within region 1, the first data manager can reach out to the identified users and offer them services or support in relation to the relevant event.

In a variation on the embodiment described above, an event such as the booking of a flight from a particular origin to a particular destination, can trigger the event manger to identify a list of users who are also affected by the event (for example who have also booked the flight). In this way, notification of such events and the affected users can be proactively sent to the relevant data managers (for example hotels in the destination region).

Preferably, across all of the methods described herein, the data matching engine can further identify when a particular user has been identified in multiple databases so that duplicate entries are not returned and so that the end user does not receive multiple repeated follow up messages.

It will also be appreciated that lists of users analysed by each interface may come from multiple different data managers within a region.

While the steps of the method described above and set out in FIG. 3 are provided in a particular order, the skilled person will appreciate that many of the method steps may be implemented in a different order without affecting the functionality of the system. For example, data may be uploaded from each of the data managers to their respective interfaces proactively and in advance of any event being identified. Moreover, steps may be omitted without affecting the system described. For example, events may be proactively identified at the data matching engine without a request first arriving from the data manager in region 1. This allows users to be proactively identified without a specific request, enabling information to be pushed to the data manager in region 1.

Moreover, it will be appreciated that the same methods as described above may be implemented across multiple regions either sequentially or in parallel so that information about one or more events can lead to the identification of users relevant to those events in multiple regions. Throughout any such implementation however, user data is not transferred between regions but with the system simply allows for the identification of users for whom information is already stored within particular regions.

Figure 4:
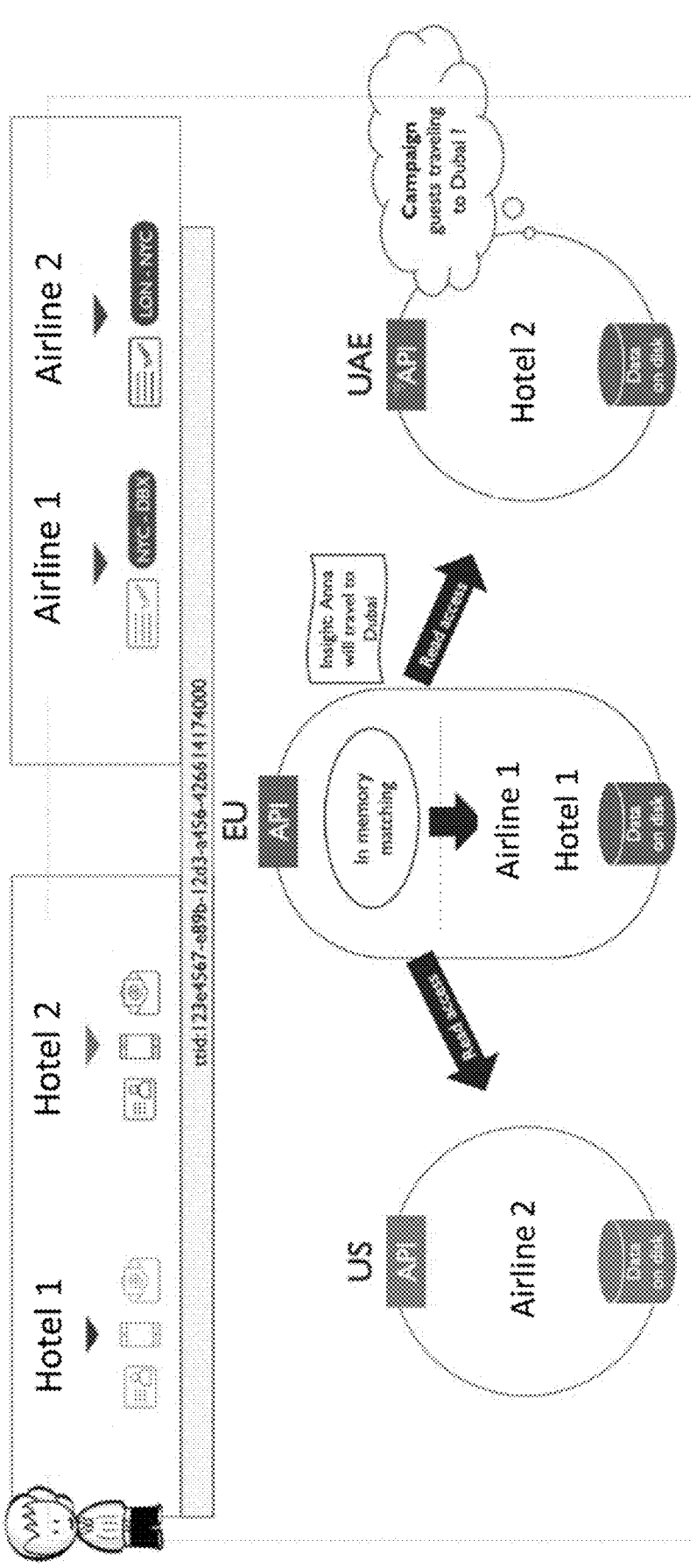
FIG. 4 illustrates a further exemplary model of a data matching system according to one embodiment.

A further implementation of the system is described below with reference to FIG. 4. FIG. 4 illustrates a system with three distinct regions between which are data borders across which data is not permitted to cross. In this case, the regions are the US, the EU and the UAE. A control layer or data matching platform sits across the regions in order to control operation of the system within those regions. In this embodiment, while an overlying platform exists, more of the functionality of the system is devolved to servers and interfaces (such as region interfaces).

The data management platform has access to a number of data managers such as hotels and airlines. Each time one of these data managers detects an event such as a flight being booked by a user, this triggers the platform to start the data matching on the basis of the trigger. An application programming interface (API) is provided in each region at the region interface together with data stored on a disk for each region based in data collected by the data managers located in that region.

When an event is triggered, for example "passenger books flight from Europe to Dubai", the European API then performs in-memory matching to match the user identifier (ttid) of the user who has booked the flight to users within the databases of its own region.

The European API can then make read access available to the UAE API, preferably via a data matching platform to enable the UAE API to attempt to match at least some of the data stored in the EU area with data already stored in the UAE region. This can enable data mangers, such as a hotel, in the UAE region to identify users experiencing the event that has been triggered and enable the hotel to market services to those identified users.

The EU API can also perform further data matching within its own region and allow read access to entities in the US region if events are triggered that point to potential matches there.

Figure 5:
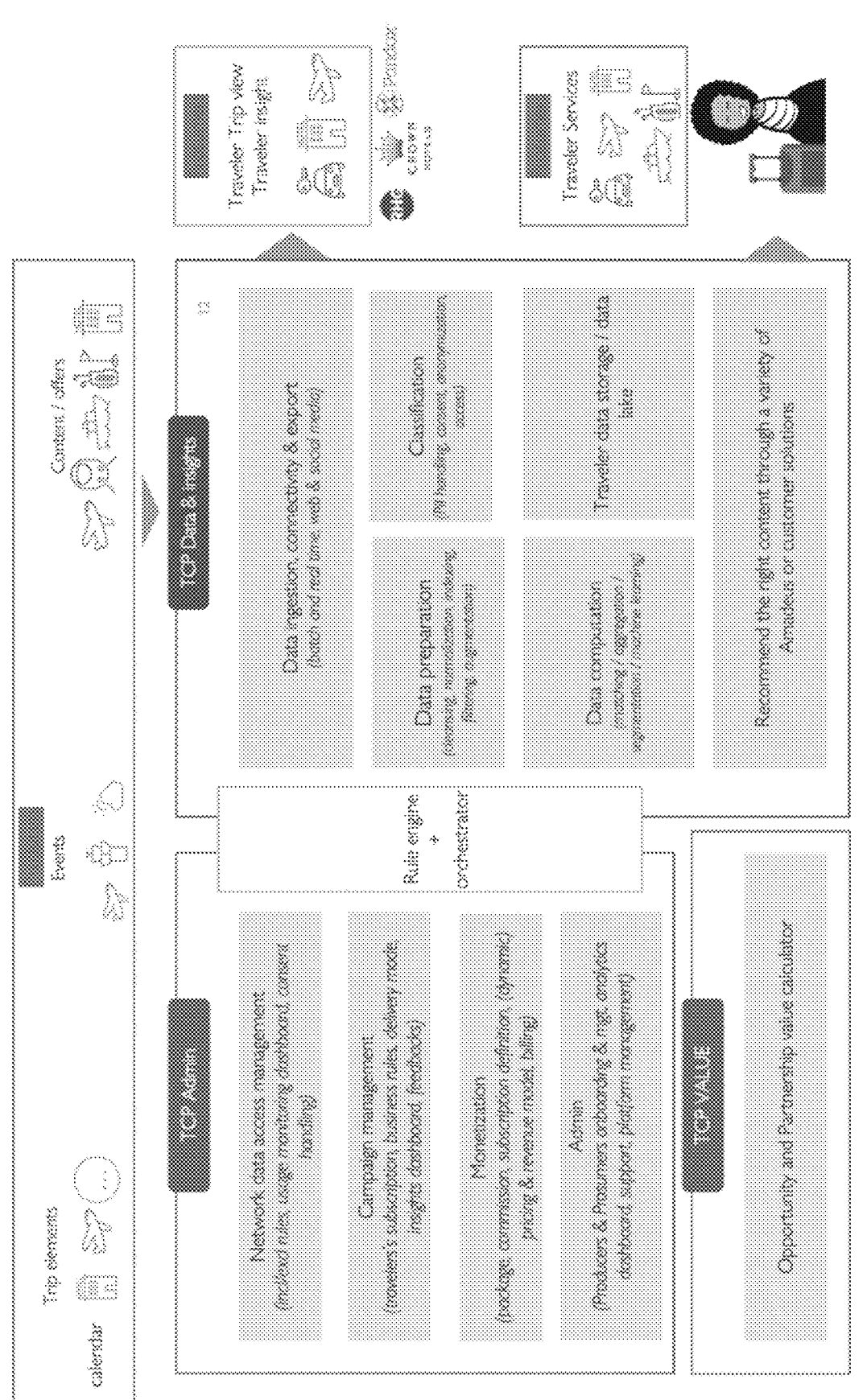
FIG. 5 illustrates a further functional overview of the system implemented as a Traveller-Centric Platform (TCP)

FIG. 5 illustrates a further functional overview of the system implemented as a Traveller-Centric Platform (TCP) although it will be appreciated that platforms with similar structure and functionality can be implemented across other industries.

Figure 6:
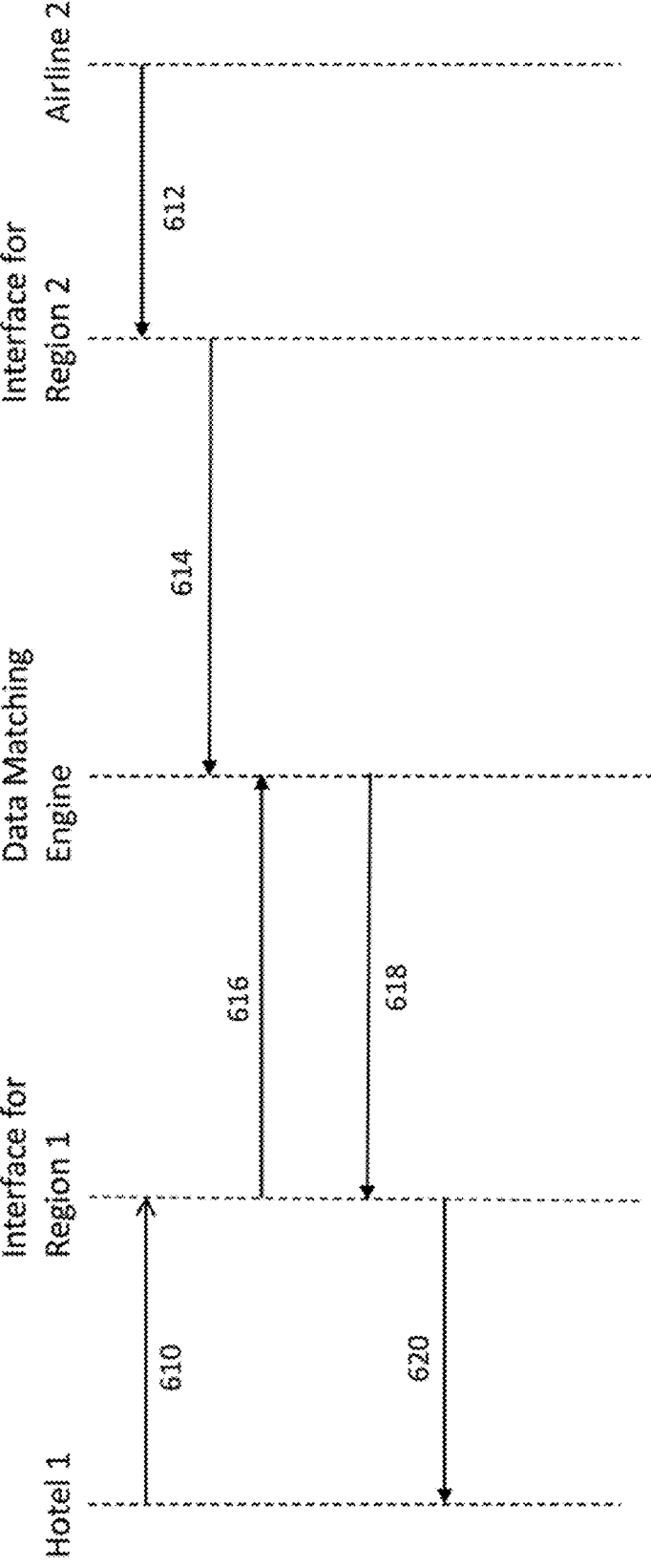
FIG. 6 illustrates schematically the operation of a data matching system according to a further embodiment.

FIG. 6 illustrates the operation of an example system according to a further embodiment. In this embodiment, a first data manager in a first region (hotel 1) and a second data manager in a second region (airline 2) uploads 610, 612 at least some of their database of user information to respective interfaces for region 1 and region 2. These databases are stored in permanent storage at the interfaces, with the data being maintained in its home region. Although FIG. 6 is shown in highly simplified form, it will be appreciated that other components are likely to be present in any practical system, such as networks of routers and servers arranged between the components illustrated. It is also likely that most regions will contain multiple data managers, for example other hotels, airlines, businesses, government entities etc. Each of these data managers uploads their database to a respective interface for their region, with one or more interfaces being provided for each region.

An event is identified within the system. For example, an event may be that a user in region 2 has booked an airline ticket, a hotel in region 1 has refurbished a number of rooms and has them available or a business has started offering a new service.

When an event is identified in region 2 (for example a new flight booking), the database from region 2 is made available to the data matching engine. For example, the database may be temporarily read into the memory 614 of the computer processing unit (CPU) within the data matching engine that will perform the data matching. The data matching engine then identifies within that database entries or users that match the event. This may be, for example, other users booked onto the same flight.

Once a subset of users has been identified from the database or databases read out of region 2, the database from region 1 is then temporarily read into the memory 616 of the CPU of the data matching engine. This enables the data matching engine to compare the subset of users determined from region 2 with the users in the database from region 1 to identify matching users. The matching users are then reported back 618 via the interface for region 1, to the data manager (in this case the hotel) in region 1 620.

In the likely situation in which there are multiple data managers in region 1 (for example multiple hotels), the data matching engine performs a matching between the subset of users identified out of region 2 with each of the databases of each of the data managers from the first region, wherein each database has been uploaded to the interface for the first region. Results are reported back to each data manager for whom at least one match has been made.

A further summary of an exemplary system is provided in the description below.

A focus for the system described herein is the handling of data sovereignty. Data is retained within the region in which the system has permission to handle it. There is first a regional aggregation and once all the Personally Identifying Information (PII) is removed, there can then be a central aggregation. The computing is performed in the region in which the data restrictions allow the system to do it. The PII data never leaves the region in which it is required to be conserved.

Lists of users are stored in different regions. When an event in region 1 is identified, there is a matching of users in lists of region 1 with lists of region 2 (where the service can be provided) and the user from region 2 is provided to the service provider. The matching happens centrally with PII removed (pseudo-anonymised).

As described herein, it is also possible to do the matching with real PII. In this case, the data is accessed within the region in order to do the matching, but the data is not taken out of the region. Distributed computation is used to implement this method. A central, master profile is created in a central region that links to sub-profiles that are regional. Nothing is actually stored centrally.

In an alternative embodiment, a hash may be generated from the PII and the system can provide matching of data based on the hash. This provides pseudo-anonymisation of the data.

As part of the system, a meta-marketplace of events can be created, which is particularly advantageous when coupled with central rule management and distributed automation as described herein. In a particular method:

1. Event metadata is centrally shared and available to all providers-consumers or data managers (since it is metadata—e.g. the list of events available, there are no sovereignty constraints or restrictions). This can provide an event catalogue, which is unified across data domains. The uniqueness of user data across providers-consumers should be ensured prior to the metadata matching.

2. Providers-consumers (data managers) can subscribe to particular events or event categories.

3. Instead of receiving the events on their own systems, consumers set up the actions they want to take directly on the central platform.

4. The central platform then locally executes the action (e.g. sends an email to the user)

In another example implementation, a hotel inputs into the system their conditions and information—e.g. we have hotels in New York and Boston. The central system then identifies events that satisfy these conditions (e.g. users scheduled to fly in to New York or Boston) and match the list of users experiencing the event to users whose data is already stored by the hotels. This method can be applied to all types of event and all service providers, of course.

In a further embodiment, the service providers may bid for lists of users experiencing events that satisfy their conditions.

An embodiment of the system that may be used to implement the methods described herein includes a number of geo-located servers that store user data (for example data about travellers). An event management system has events (such as flights) as input and identifies a number of users affected or correlated with the event. It also stores the conditions or properties of the service providers (e.g. hotel location). A matching system matches affected users with all of the user lists of the service providers (one-to-many matching). Travelers may have different profiles in different lists (different contact methods) so deterministic and probabilistic matching may occur. Perfect matching may be used, but machine learning can also enable "fuzzy matching" that recognises abbreviations, etc. Matched users are then sent as a list to the service provider for their campaign.

The two systems are on a platform known as the Traveler-Centric Platform in a particular embodiment. The platform is an event-driven data matching engine.

This is set up as a cloud-based system to enable secure communication between the regions.

With regard to use of the system, there are different possibilities, but the system may require a combination of subscription model (service provider pays subscription for this service) and fee per volume of matches.

It is envisaged to generate Key Performance Indicators (KPI) on aggregated data as a service. For example, a KPI could be number of travellers going to the US during a set period. A service provider could use this to obtain knowledge about the market rather than simply purchasing user lists. An aggregation tool is optionally implemented on the platform to do this aggregation (optionally, this is the same platform as does the matching).

The methods described herein may also be based on an explicit consent-based model. Consent may be stored alongside a user name. e.g. user has allowed Air France to share info with Marriott. Or user has allowed Air France to share info with any third party.

Users can be included, with "no consent" on the table next to the name. This "no consent" PII cannot be given to the service provider but the user data can be used in the aggregated data (anonymously), which then has a value.

Yet another table may store consent data from the service providers. E.g. Air France may say that no user data may be shared with Marriott. The tables can be set up the tables to say who has a veto on data sharing—the user whose data it is or the service provider who has said no (e.g. if they say opposite things).

As a further embodiment, suggestions can be made to the service providers about with whom they could partner, e.g. based on large correlations between their users.

In summary, the systems described herein provide databases organised in different jurisdictions with user lists stored in the jurisdiction appropriate to the data sovereignty. Read access is given to subscribers of content stored based on an event trigger.

The invention claimed is:

1. A method for correlating user data across a data border between regions, the method comprising:
obtaining access to a first database of user data stored by a first data manager in a first region;
obtaining access to a second database of user data stored by a second data manager in a second region;
identifying at least one event triggered by a user or a data manager in the first or second region;
analysing the second database of user data to identify a subset of user data for one or more users correlated with the event;
comparing the identified subset of user data from the second database with user data in the first database to obtain a matching subset of user data from the first database; and
reporting the matching subset of user data from the first database to the first data manager, wherein the matching subset of user data from the first database identifies data already stored at the first database, and excludes respective data, including the identified subset of user data, from the second database.

2. The method according to claim 1, further comprising obtaining metadata for the first data manager.

3. The method according to claim 2, wherein obtaining the metadata comprises storing metadata for one or more data managers in a central database.

4. The method according to claim 2, wherein identifying at least one event comprises receiving a request from the first data manager to obtain matching user data, the request including metadata for the first data manager.

5. The method according to claim 1, further comprising obtaining or generating event metadata for the at least one event.

6. The method according to claim 1, wherein the first region comprises a plurality of data managers each having a corresponding database of user data, wherein comparing the identified subset of user data comprises comparing the identified subset with user data in each of the plurality of databases and wherein reporting comprises reporting a matching subset of user data to each of the data managers for whom matching user data has been identified.

7. The method according to claim 1, further comprising storing a database of events tagged with event metadata.

8. The method according to claim 1, wherein obtaining access to a first or second database comprises copying the first or second database to a storage interface in the first or second region respectively.

9. The method according to claim 1, wherein analysing the second database comprises comparing event metadata for the at least one event to user data for the one or more users in the second database to identify one or more users correlated with the event.

10. The method according to claim 9, wherein analysing comprises identifying exact matches between the event metadata and the user data or wherein analysing comprises performing a fuzzy match correlation or a probabilistic match correlation between the event metadata and the user data.

11. The method according to claim 1, wherein comparing the identified user data for the one or more users correlated with the event with user data in the first database of user data comprises identifying exact matches or performing a fuzzy match correlation or a probabilistic match correlation.

12. The method according to claim 1, further comprising storing a list of events together with associated event metadata and publishing the list of events to one or more data managers.

13. The method according to claim 1, further comprising at least partially anonymising the user data stored in the first or second database.

14. The method according to claim 13, wherein at least partially anonymising comprises masking personally identifying information or generating a hash of the personally identifying information.

15. A data matching system for correlating user data across a data border between regions, the system comprising:

a first interface for obtaining access to a first database of user data stored by a first data manager in a first region;

a second interface for obtaining access to a second database of user data stored by a second data manager in a second region;

a data matching engine comprising at least one processor and a computer program, computer program product or non-transitory computer-readable medium storing instructions that, when executed by the at least one processor, cause the at least one processor to perform operations comprising:

identifying at least one event triggered by a user or a data manager in the first or second region and analysing the second database of user data to identify user data for one or more users correlated with the event;

comparing the identified user data for the one or more users, from the second database, correlated with the event, with user data in the first database of user data to obtain a subset of user data from the first database that matches the one or more users, from the second database, correlated with the event; and reporting the subset of user data from the first database to the first data manager, wherein the subset of user data from the first database identifies data already stored at the first database, and excludes respective data, including the identified user data for the one or more users, from the second database.

16. A method for correlating user data across a data border between regions, the method comprising:

obtaining access to a first database of user data stored by a first data manager in a first region;

obtaining access to a second database of user data stored by a second data manager in a second region;

analysing the first database of user data and the second database of user data to identify a matching subset of user data;

generating at least one correlation profile between the first data manager and the second data manager based on the analysis, wherein the at least one correlation profile is based on the analysis identifying the matching subset of user data;

reporting the at least one correlation profile to at least one of the first data manager and the second data manager, wherein a first correlation profile reported to the first data manager identifies a first matching subset of user data from the first database that identifies data already stored at the first database, and excludes respective data from the second database, and wherein a second correlation profile reported to the second data manager identifies a second matching subset of user data from the second database that identifies respective data already stored at the second database, and excludes respective data from the first database.

* * * * *